(12) United States Patent
Burton, Jr.

(10) Patent No.: US 7,648,694 B2
(45) Date of Patent: Jan. 19, 2010

(54) METHOD FOR PREPARING SSZ-26/33 ZEOLITES USING NOVEL STRUCTURE DIRECTING AGENTS

(75) Inventor: Allen W. Burton, Jr., Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 12/249,770

(22) Filed: Oct. 10, 2008

(65) Prior Publication Data

US 2009/0060835 A1 Mar. 5, 2009

(51) Int. Cl.
*C01B 39/00* (2006.01)
*C01B 39/02* (2006.01)
*B01J 21/06* (2006.01)

(52) U.S. Cl. .................. 423/704; 423/701; 502/100
(58) Field of Classification Search .................. 423/701, 423/704; 502/100; *C01B 39/06*
See application file for complete search history.

(56) References Cited

U.S. PATENT DOCUMENTS 4,910,006 A 3/1990 Zones et al.
4,963,337 A 10/1990 Zones
5,972,204 A 10/1999 Corma Canos et al.
2008/0050308 A1* 2/2008 Vermeiren et al. .......... 423/704

FOREIGN PATENT DOCUMENTS

WO WO 2005/097679 * 10/2005

OTHER PUBLICATIONS

Gimenez et al., An Study of Cyclohexlypyrrolidine-Derived Quaternary Organic Cations As Structure Directing Agents For Synthes s Of Zeolites, Studies in Surface Science and Catalysis, 2004. p. 265-274, vol. 154, Elsevier B.V.
Lobo et al., SSZ-26 and SSZ-33: Two Molecular Sleves with Intersecting 10- and 12-Ring Pores, Science, Dec. 3, 1993, p. 1543-1546, vol. 262.
Treacy et al., Collection of Simulated XRD Powder Patterns For Zeolites, 2007, p. 481. Fifth Revised Edition, Elsevier.

* cited by examiner

*Primary Examiner*—Roy King
*Assistant Examiner*—Alexander Polyansky
(74) *Attorney, Agent, or Firm*—Michael D. Ross

(57) ABSTRACT

The present invention is directed to a process for preparing zeolites belonging to the SSZ-26/33 family of zeolites using novel nitrogen-based structure directing agents. The process for preparing the SSZ-26/33 family of zeolites involves using a structure directing agent selected from the group consisting of 1,5-bis(N,N-dimethylcyclohexylammonium)pentane dications, 1,4-bis(N-cyclohexylpiperidinium)butane dications and 1,4-bis(N-cyclopentylpiperidinium)butane dications.

10 Claims, 10 Drawing Sheets

METHOD FOR PREPARING SSZ-26/33 ZEOLITES USING NOVEL STRUCTURE DIRECTING AGENTS

FIELD OF THE INVENTION

The present invention is directed to a process for preparing zeolites belonging to the SSZ-26/33 family of zeolites using novel nitrogen-based structure directing agents ("SDA").

BACKGROUND OF THE INVENTION

Borosilicate SSZ-33 and methods for making it are disclosed in U.S. Pat. No. 4,963,337, issued Oct. 16, 1990 to Zones. This patent discloses use of a tricyclodecane quaternary ammonium ion SDA to synthesize SSZ-33.

Borosilicate SSZ-33 and methods for making it are also disclosed in U.S. Pat. No. 5,972,204, issued Oct. 26, 1999 to Corma et al. This patent discloses the synthesis of SSZ-33 from beta zeolite using 1-N,N,N-trimethyl adamantammonium hydroxide and 2-N,N,N-trimethyl adamantammonium hydroxide as SDAs.

Aluminosilicate SSZ-26 and methods for making it are disclosed in U.S. Pat. No. 4,910,006, issued Mar. 20, 1990 to Zones et al. SSZ-26 does not require the presence of boron in its crystal framework, and can be an aluminosilicate. This patent discloses using a hexamethyl[4.3.3.0]propellane-8,11-diammonium cation SDA to synthesize SSZ-26. SSZ-26 has also been synthesized using cis-N,N-diethyldecahydroquinolinium as the SDA, as described in U.S. Publication No. 2008/0089835, published Apr. 17, 2008.

Aluminosilicate ITQ-23 has been synthesized using a fluoride-mediated synthesis route using a 1,4-bis(N-cyclohexylpyrrolidinium)butane dication as a SDA. (See, Corma et al., "A Study of Cyclohexylpyrrolidine-Derived Quaternary Organic Cations as Structure Directing Agents for Synthesis of Zeolites" from the Proceedings of the 14$^{th}$ International Zeolite Conference, Cape Town, South Africa, Apr. 25-30, 2004, published in *Studies in Surface Science and Catalysis*, Vol. 154, pp. 265-274).

SSZ-26 and SSZ-33 are zeolites which contain a three-dimensional pore system composed of intersecting 10- and 12-ring pores. (See, Lobo et al., "SSZ-26 and SSZ-33: Two Molecular Sieves with Intersecting 10- and 12-Ring Pores" *Science*, Vol. 262. no. 5139, pp. 1543-1546, Dec. 3, 1993). These two zeolites can be characterized as members of a family of materials in which the two end members are formed by the stacking of layers in an ABAB sequence or an ABCABC sequence. The framework formed by the ABAB stacking sequence ("polymorph A") is of orthorhombic symmetry and the framework formed by the ABCABC stacking sequence ("polymorph B") is of monoclinic symmetry. In between these end-member polymorphs there is a whole family of materials that can be characterized by a fault probability "p" of 0%<p<100% (referred to herein as "SSZ-26/33 family"). If the fault probability is p=0%, the end member polymorph B is obtained, and if p=100%, the end member polymorph A is obtained. The aluminosilicate SSZ-26 and the borosilicate SSZ-33 are members of this disorder family of materials and CIT-1 corresponds to a pure or nearly pure polymorph B. (See, CON Framework Datasheet, Baerlocher et al., *Atlas of Zeolite Framework Types*, 6$^{th}$ Ed. (2007)) (See also, CON powder pattern and SSZ33/SSZ96 family, polymorph A—polymorph B powder pattern simulations of disordered intergrowths, Treacy et al., *Collection of Simulated XRD Powder Patterns for Zeolites*, 4$^{th}$ Ed., (2001)).

SSZ-26 and SSZ-33 are used in many commercial applications, including hydrocarbon trapping applications. These two zeolites have been found to be among the best zeolites for hydrocarbon trapping applications in automobiles due to their robust hydrothermal stability and their relatively high hydrocarbon adsorption capacities.

However, known SDAs for making SSZ-26 and SSZ-33 are costly because of their exotic structures. The cost-effectiveness of the SDA is an important parameter for commercial zeolite manufacturing. Further, current commercial scale synthesis of SSZ-26 and SSZ-33 is time consuming. Therefore, there is a current need for new, lower-cost SDAs which are suitable for synthesizing SSZ-26/33 zeolites of satisfactory purity and in a shorter time period.

SUMMARY OF THE INVENTION

In accordance with the present invention, there is provided a process for preparing zeolites belonging to the SSZ-26/33 family of zeolites by:

(a) preparing a reaction mixture containing (1) at least one active source of an oxide selected from the group consisting of oxides of silicon, germanium, and a mixture thereof; (2) one or more sources of an oxide selected from the group consisting of oxides of aluminum, boron, iron, gallium, and mixtures thereof; (3) at least one active source of an element selected from Groups 1 and 2 of the Periodic Table; (4) hydroxide ions, (5) a SDA dication selected from the group consisting of the following SDA dications:

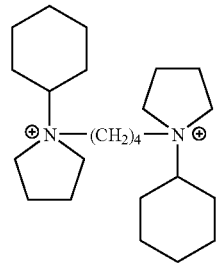

1,4-bis(N-cyclohexylpyrrolidinium)butane dication

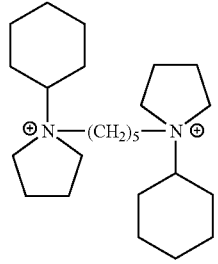

1,5-bis(N-cyclohexylpyrrolidinium)pentane dication

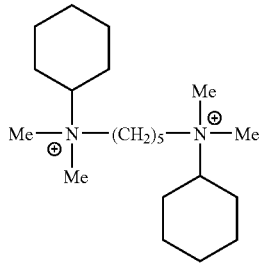

1,5-bis(N,N-dimethylcyclohexylammonium)pentane dication

-continued

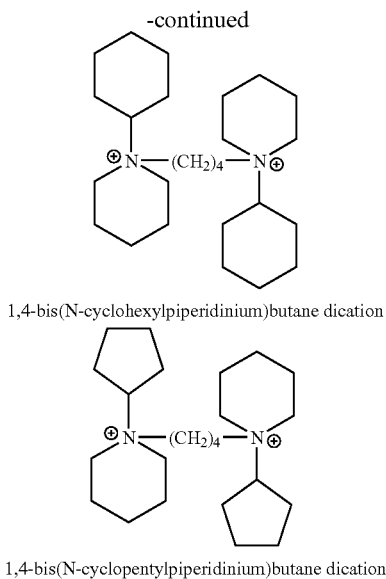

1,4-bis(N-cyclohexylpiperidinium)butane dication 1,4-bis(N-cyclopentylpiperidinium)butane dication and (6) water; and (b) maintaining the reaction mixture under conditions sufficient to form crystals of the zeolite.

Where the zeolite formed is an intermediate zeolite, the process of the present invention includes a further step of synthesizing a target zeolite by post-synthesis techniques, such as heteroatom lattice substitution techniques and acid leaching.

The present invention also provides SSZ-26/33 zeolites made by the process of the present invention having a composition, as-synthesized and in the anhydrous state, in terms of mole ratios, is as follows:

| | |
|---|---|
| $YO_2/W_cO_d$ | 20-120 |
| $Q/YO_2$ | 0.015-0.05 |
| $M/YO_2$ | 0-0.04 | wherein:

(1) Y is selected from the group consisting of silicon (Si), germanium (Ge), and a mixture thereof;

(2) W is selected from the group consisting of oxides of aluminum (Al), boron (B), iron (Fe), gallium (Ga), and mixtures thereof;

(3) c is 1 or 2; d is 2 when c is 1 (i.e., W is tetravalent) or d is 3 or 5 when c is 2 (i.e., d is 3 when W is trivalent or 5 when W is pentavalent);

(4) M is selected from the group consisting of elements from Groups 1 and 2 of the Periodic Table; and (4) Q is a SDA selected from the group consisting of 1,4-bis(N-cyclohexylpyrrolidinium)butane dications, 1,5-bis(N-cyclohexylpyrrolidinium)pentane dications, 1,5-bis(N,N-dimethylcyclohexylammonium)pentane dications, 1,4-bis(N-cyclohexylpiperidinium)butane dications and 1,4-bis(N-cyclopentylpiperidinium)butane dications.

DETAILED DESCRIPTION OF THE INVENTION

Introduction

Figure 1:
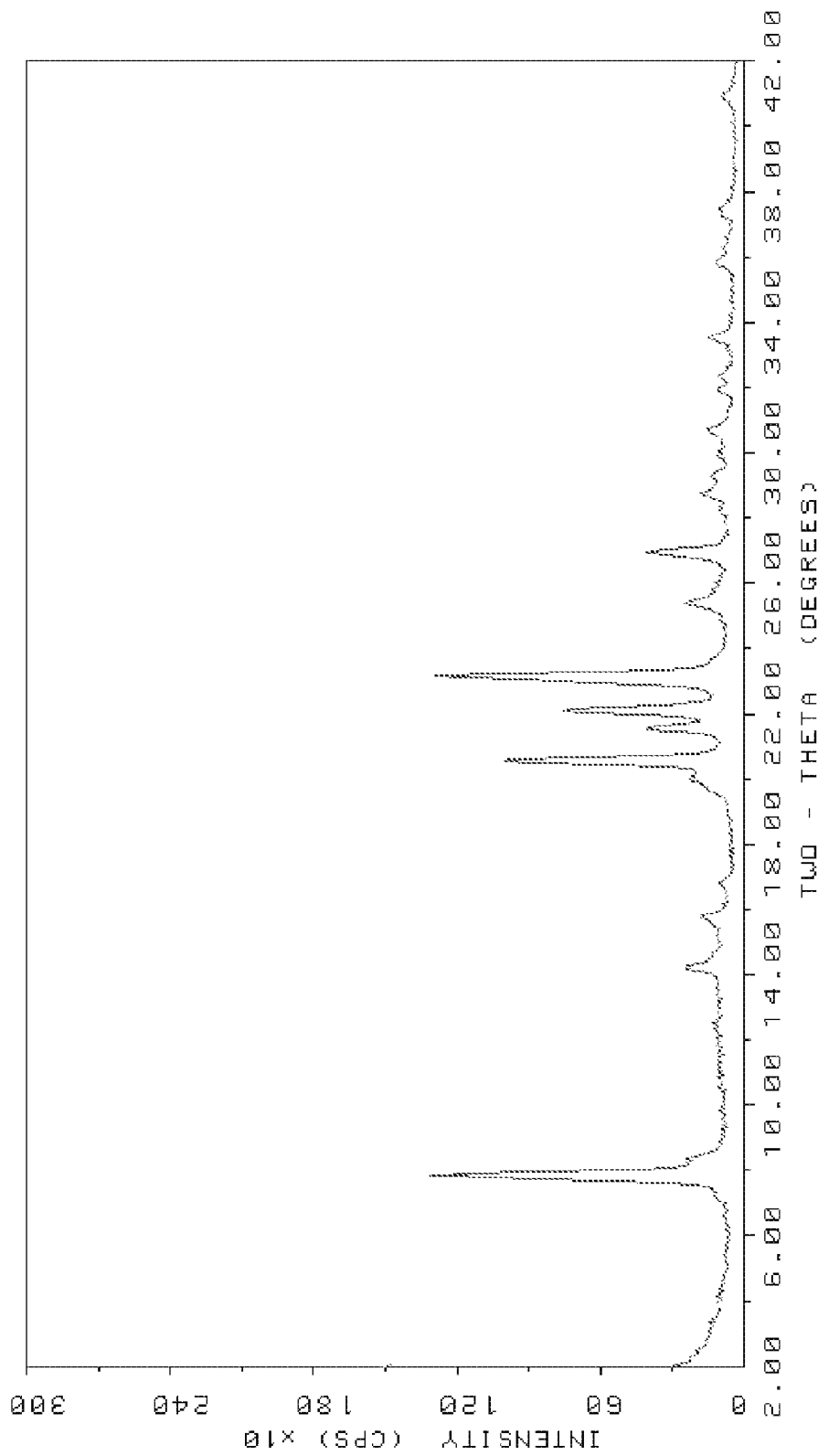
FIG. 1 shows the results of a powder x-ray diffraction (XRD) analysis of the zeolite prepared in Example 7.

The term "active source" means a reagent or precursor material capable of supplying an element in a form that can react and be incorporated into the zeolite structure. The terms "source" and "active source" are used interchangeably herein.

The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985).

The term "zeolite" includes (a) intermediate and (b) final or target zeolites produced by (1) direct synthesis or (2) post-crystallization treatment (secondary synthesis). Secondary synthesis techniques allow for the synthesis of a target zeolite from an intermediate zeolite using techniques such as heteroatom lattice substitution techniques and acid leaching. For example, an aluminosilicate can be synthesized from an intermediate borosilicate by post-crystallization heteroatom lattice substitution of the Al for B. Such techniques are known, for example as described in U.S. Pat. No. 6,790,433 to C. Y. Chen and Stacey Zones, issued Sep. 14, 2004.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants, are intended to be non-limiting, such that recitation of items in a list is not to the exclusion of other like items that may also be useful in the materials, compositions and methods of this invention.

Reaction Mixture

In accordance with the present invention, there is provided a process for preparing zeolites belonging to the SSZ-26/33 family of zeolites by:

(a) preparing a reaction mixture containing (1) at least one active source of an oxide selected from the group consisting of oxides of silicon, germanium, and a mixture thereof; (2) one or more active source(s) of an oxide selected from the group consisting of oxides of aluminum, boron, iron, gallium, and mixtures thereof; (3) at least one active source of an element selected from Groups 1 and 2 of the Periodic Table; (4) hydroxide ions; (5) a SDA selected from the group consisting of SDA dications represented by the following structures (1) through (5):

(1)
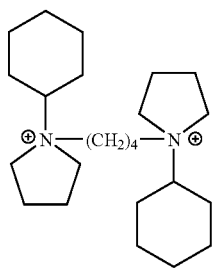
1,4-bis(N-cyclohexylpyrrolidinium)butane dication (2)
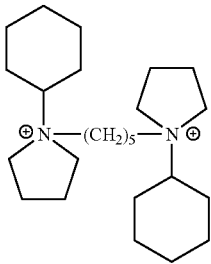
1,5-bis(N-cyclohexylpyrrolidinium)pentane dication (3)
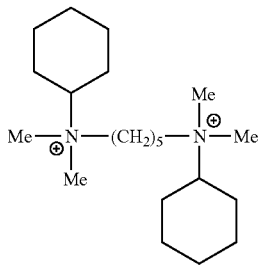
1,5-bis(N,N-dimethylcyclohexylammonium)pentane dication (4)
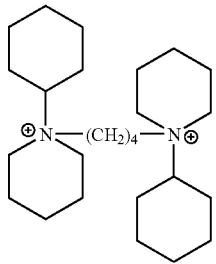
1,4-bis(N-cyclohexylpiperidinium)butane dication (5)
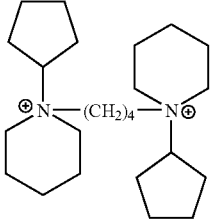
1,4-bis(N-cyclopentylpiperidinium)butane dication and (6) water; and (b) maintaining the reaction mixture under conditions sufficient to form crystals of the zeolite.

Where the zeolite formed is an intermediate zeolite, the process of the present invention includes a further step of synthesizing a target zeolite by post-synthesis techniques such as heteroatom lattice substitution techniques and acid leaching.

The composition of the reaction mixture from which the zeolite is formed, in terms of molar ratios, is identified in Table 1 below, wherein compositional variables Y, W, Q and M are as described herein above.

TABLE 1

| Reactants | Broad | Preferred |
|---|---|---|
| $YO_2/W_2O_3$ molar ratio | 8-120 | 10-60 |
| $M/YO_2$ molar ratio | 0.05-0.50 | 0.05-0.30 |
| $Q/YO_2$ molar ratio | 0.05-0.50 | 0.10-0.25 |
| $OH/YO_2$ molar ratio | 0.10-1.0 | 0.20-0.50 |
| $H_2O/YO_2$ molar ratio | 10-200 | 20-60 |

In one subembodiment, wherein the zeolite is a zeolite belonging to the SSZ-26 family, the composition of the reaction mixture from which the zeolite is formed, in terms of molar ratios, is identified in Table 2 below, wherein Q and M are as described herein above.

TABLE 2

| Reactants | Broad | Preferred |
|---|---|---|
| $SiO_2/Al_2O_3$ molar ratio | 20-80 | 20-50 |
| $M/SiO_2$ molar ratio | 0.05-0.50 | 0.05-0.30 |
| $Q/SiO_2$ molar ratio | 0.05-0.50 | 0.10-0.25 |
| $OH/SiO_2$ molar ratio | 0.10-1.0 | 0.20-0.50 |
| $H_2O/SiO_2$ molar ratio | 10-200 | 20-60 |

In another subembodiment, wherein the zeolite is a zeolite belonging to the SSZ-33 family, the composition of the reaction mixture from which the zeolite is formed, in terms of molar ratios, is identified in Table 3 below, wherein Q and M are as described herein above.

TABLE 3

| Reactants | Broad | Preferred |
|---|---|---|
| $SiO_2/B_2O_3$ molar ratio | 8-120 | 10-60 |
| $M/SiO_2$ molar ratio | 0.05-0.50 | 0.05-0.30 |
| $Q/SiO_2$ molar ratio | 0.05-0.50 | 0.10-0.25 |
| $OH/SiO_2$ molar ratio | 0.10-1.0 | 0.20-0.50 |
| $H_2O/SiO_2$ molar ratio | 10-200 | 20-60 |

Sources useful herein for Si include fumed silica, precipitated silicates, silica hydrogel, silicic acid, colloidal silica, tetra-alkyl orthosilicates (e.g. tetraethyl orthosilicate), and silica hydroxides. Sources useful herein for Ge include germanium oxide and germanium ethoxide.

Sources of elements selected for optional composition variable W include oxides, hydroxides, acetates, oxalates, ammonium salts and sulfates of the element(s) selected for W. Typical sources of aluminum oxide ($Al_2O_3$) when used in the reaction mixture include aluminates, alumina, and aluminum compounds such as $AlCl_3$, $Al_2(SO_4)_3$, aluminum hydroxide ($Al(OH)_3$), kaolin clays, and other zeolites. An example of the source of aluminum oxide is LZ-210 zeolite (a type of Y zeolite). Germanium, boron, gallium, titanium and iron can be added in forms corresponding to their aluminum and silicon counterparts.

As described herein above, for each embodiment described herein, the reaction mixture is formed using at least one active source of an element selected from Groups 1 and 2 of the Periodic Table (referred to herein as M). In one subembodiment, the reaction mixture is formed using an active source of an element from Group 1 of the Periodic Table. In another subembodiment, the reaction mixture is formed using an active source of sodium (Na). Any M-containing compound which is not detrimental to the crystallization process is suitable. Sources for such Groups 1 and 2 elements include oxides, hydroxides, nitrates, sulfates, halogenides, oxalates, citrates and acetates thereof.

The SDA dication is typically associated with anions ($X^-$) which may be any anion that is not detrimental to the formation of the zeolite. Representative anions include elements from Group 18 of the Periodic Table (e.g., fluoride, chloride, bromide and iodide), hydroxide, acetate, sulfate, tetrafluoroborate, carboxylate, and the like.

The 1,4-bis(N-cyclohexylpyrrolidinium)butane and 1,5-bis(N-cyclohexylpyrrolidinium)pentane dication SDAs of the present invention (represented by structures (1) and (2) herein) can be synthesized by reacting a dihaloalkane (such as 1,4-dibromobutane and 1,5-dibromopentane) with N-yclohexylpyrrolidine. In one embodiment, N-cyclohexylpyrrolidine is synthesized by hydrogenation of 1-pyrrolidino-1-cyclohexene. Methods for hydrogenation of 1-pyrrolidino-1-cyclohexene are taught in Example 7 of U.S. Pat. No. 6,544,495 to Saleh Elomari, issued Apr. 8, 2003.

The 1,5-bis(N,N-dimethylcyclohexylammonium)pentane dication SDA of the present invention (represented by formula (3) herein) can be synthesized by reacting a dihaloalkane (such as 1,5-dibromopentane) with dimethylcyclohexylamine.

The 1,4-bis(N-cyclohexylpiperidinium)butane dication SDA of the present invention (represented by structure 4 herein) can be synthesized by reacting a dihaloalkane (such as 1,4-dibromobutane) with N-cyclohexylpiperidine.

The 1,4-bis(N-cyclopentylpiperidinium)butane dication SDA of the present invention (represented by structure 5 herein) can be synthesized by reacting a dihaloalkane (such as 1,4-dibromobutane) with N-cyclopentylpiperidine. In one embodiment, N-cyclopentylpiperidine is synthesized by hydrogenation of 1-piperidino-1-cyclopentene.

For each embodiment described herein, the zeolite reaction mixture can be supplied by more than one source. Also, two or more reaction components can be provided by one source. For example, borosilicate zeolites may be synthesized by the method of the present invention using boron-containing beta zeolite as taught in U.S. Pat. No. 5,972,204, issued Oct. 26, 1999 to Corma et al.

The reaction mixture can be prepared either batch wise or continuously. Crystal size, morphology and crystallization time of the crystalline zeolite described herein may vary with the nature of the reaction mixture and the crystallization conditions.

Crystallization and Post-synthesis Treatment

In practice, the zeolite is prepared by:
(a) preparing a reaction mixture as described herein above; and
(b) maintaining the reaction mixture under crystallization conditions sufficient to form crystals of the zeolite.

The reaction mixture is maintained at an elevated temperature until the crystals of the zeolite are formed. The hydrothermal crystallization is usually conducted under pressure, and usually in an autoclave so that the reaction mixture is subject to autogenous pressure, at a temperature between 125° C. and 200° C.

The reaction mixture may be subjected to mild stirring or agitation during the crystallization step. It will be understood by a person skilled in the art that the zeolites described herein may contain impurities, such as amorphous materials, unit cells having framework topologies which do not coincide with the zeolite, and/or other impurities (e.g., organic hydrocarbons).

During the hydrothermal crystallization step, the zeolite crystals can be allowed to nucleate spontaneously from the reaction mixture. The use of crystals of the zeolite as seed material can be advantageous in decreasing the time necessary for complete crystallization to occur. In addition, seeding can lead to an increased purity of the product obtained by promoting the nucleation and/or formation of the zeolite over any undesired phases. When used as seeds, seed crystals are added in an amount between 1% and 10% of the weight of the source for compositional variable Y used in the reaction mixture.

Once the zeolite crystals have formed, the solid product is separated from the reaction mixture by standard mechanical separation techniques such as filtration. The crystals are water-washed and then dried to obtain the as-synthesized zeolite crystals. The drying step can be performed at atmospheric pressure or under vacuum.

The zeolite can be used as-synthesized, but typically will be thermally treated (calcined). The term "as-synthesized" refers to the zeolite in its form after crystallization, prior to removal of the SDA cation and/or M. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the zeolite. The SDA can also be removed by photolysis techniques (e.g. exposing the SDA-containing zeolite product to light or electromagnetic radiation that has a wavelength shorter than visible light under conditions sufficient to selectively remove the organic compound from the zeolite) as described in U.S. Pat. No. 6,960,327 to Navrotsky and Parikh, issued Nov. 1, 2005.

The zeolite can subsequently be calcined in steam, air or inert gas at temperatures ranging from about 200° C. to about 800° C. for periods of time ranging from 1 to 48 hours, or more. Usually, it is desirable to remove the alkali metal cation (if any) by ion exchange and replace it with hydrogen, ammonium, or any desired metal-ion.

Where the zeolite formed is an intermediate zeolite, the target zeolite can be achieved using post-synthesis techniques such as heteroatom lattice substitution techniques and acid leaching techniques.

The zeolite made from the process of the present invention can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the zeolite can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa.

Characterization of the Zeolite

Zeolites made by the process of the present invention have a composition, as-synthesized and in the anhydrous state, as described in Table 4 (in terms of mole ratios), wherein Y, W, Q and M are as described herein above:

TABLE 4

| | |
|---|---|
| $YO_2/W_2O_3$ | 20-120 |
| $Q/YO_2$ | 0.015-0.05 |
| $M/YO_2$ | 0-0.04 |

Zeolites made by the process of the present invention have a composition, after receiving secondary synthesis treatment, as described in Table 4 wherein the $YO_2/W_2O_3$ molar ratio is 20-∞.

In one subembodiment, the zeolites made by the process of the present invention belong to the SSZ-26 family of zeolites and have a composition, as-synthesized and in the anhydrous state, as described in Table 5 (in terms of mole ratios), wherein Q and M are as described herein above:

TABLE 5

| | |
|---|---|
| $SiO_2/Al_2O_3$ | 20-80 |
| $Q/SiO_2$ | 0.015-0.05 |
| $M/SiO_2$ | 0-0.04 |

In another subembodiment, the zeolites made by the process of the present invention belong to the SSZ-33 family of zeolites and have a composition, as-synthesized and in the anhydrous state, as described in Table 6 (in terms of mole ratios), wherein Q and M are as described herein above:

TABLE 6

| | |
|---|---|
| $SiO_2/B_2O_3$ | 20-120 |
| $Q/SiO_2$ | 0.015-0.05 |
| $M/SiO_2$ | 0-0.04 |

Zeolites synthesized by the process of the present invention are characterized by their X-ray diffraction pattern. The X-ray diffraction pattern lines of Tables 7 and 8 are representative of as-synthesized SSZ-26 and SSZ-33-type zeolites, respectively, made in accordance with this invention. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Y/W mole ratio from sample to sample. Calcination can also cause minor shifts in the X-ray diffraction pattern. Notwithstanding these minor perturbations, the basic crystal lattice structure remains unchanged.

TABLE 7

Characteristic Peaks for As-Synthesized SSZ-26

| 2 Theta[a] | d-spacing (Angstroms) | Relative Absolute Intensity (%)[b] |
|---|---|---|
| 7.77 | 11.37 | VS |
| 20.27 | 4.38 | VS |
| 21.32 | 4.16 | M |
| 21.92 | 4.05 | S |
| 22.76 | 3.90 | S |
| 22.92 | 3.88 | VS |
| 26.53 | 3.36 | M |

[a] ±0.20
[b] The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

TABLE 8

Characteristic Peaks for As-Synthesized SSZ-33

| 2 Theta[a] | d-spacing (Angstroms) | Relative Absolute Intensity (%)[b] |
|---|---|---|
| 7.90 | 11.19 | VS |
| 20.60 | 4.31 | VS |
| 21.61 | 4.11 | M |
| 22.18 | 4.00 | S |
| 23.20 | 3.83 | VS |
| 27.01 | 3.30 | M |

[a] ±0.20
[b] The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

The X-ray diffraction pattern lines of Tables 9 and 10 are representative of calcined. SSZ-26 and SSZ-33-type zeolites, respectively, made in accordance with this invention.

TABLE 9

Characteristic Peaks for Calcined SSZ-26

| 2 Theta[a] | d-spacing (Angstroms) | Relative Absolute Intensity (%)[b] |
|---|---|---|
| 7.75 | 11.40 | VS |
| 20.21 | 4.39 | M |
| 21.29 | 4.17 | W |
| 21.93 | 4.05 | M |
| 22.87 | 3.89 | M |
| 23.07 | 3.85 | S |
| 26.49 | 3.36 | M |

[a] ±0.20
[b] The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

TABLE 10

Characteristic Peaks for Calcined SSZ-33

| 2 Theta[a] | d-spacing (Angstroms) | Relative Absolute Intensity (%)[b] |
|---|---|---|
| 7.91 | 11.16 | VS |
| 20.61 | 4.31 | M |
| 21.62 | 4.11 | W |
| 22.20 | 4.00 | M |

TABLE 10-continued

Characteristic Peaks for Calcined SSZ-33

| 2 Theta[a] | d-spacing (Angstroms) | Relative Absolute Intensity (%)[b] |
|---|---|---|
| 23.32 | 3.81 | S |
| 27.02 | 3.30 | W |

[a]±0.20
[b]The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

The Powder X-ray diffraction patterns presented herein were collected by standard techniques. The radiation was CuK-α radiation. The peak heights and the positions, as a function of 2θ where θ is the Bragg angle, were read from the relative absolute intensities of the peaks (adjusting for background), and d, the interplanar spacing in Angstroms corresponding to the recorded lines, can be calculated.

EXAMPLES

The following examples demonstrate but do not limit the present invention.

Synthesis of SDAs

Example 1

Synthesis of N-cyclohexylpyrrolidine from 1-Pyrrolidino-1-cyclohexene

N-Cyclohexylpyrrolidine was-synthesized by hydrogenation of 1-pyrrolidino-1-cyclohexene (Sigma-Aldrich) per the teachings in Example 7 of U.S. Pat. No. 6,544,495 to Saleh Elomari, issued Apr. 8, 2003.

Example 2

Synthesis of 1,4-bis(N-cyclohexylpyrrolidinium)butane Dication

In a 250 mL round-bottom flask, 18.84 g N-cyclohexylpyrrolidine synthesized per Example 1 was dissolved in 75 mL acetone. Then 11.96 g 1,4-dibromobutane was added to the solution. The resultant solution was allowed to sit at room temperature for three weeks. The acetone was then removed by rotoevaporation. The resultant residues were then dissolved in isopropanol and the solution was then intermittently refluxed for 2-3 hour periods over the course of a week. After each refluxing period, the isopropanol was removed and the residues were washed with acetone. The product diquaternary ammonium sail then precipitated as a tan solid. The tan solid was then isolated by vacuum filtration. The resultant solid was then thoroughly rinsed with isopropanol to remove any reactant or monoquaternary products. The product was subsequently rinsed with acetone and then with ethyl ether.

After drying, the purity of the product salt was verified by 1H and 13C NMR. The filtrates were then combined and the refluxing of the isopropanol solutions was repeated to obtain additional product. The purified crops were then combined and ion-exchanged into the hydroxide form by dissolving the salts in water and adding a two-fold excess of AG-1-X8 Biorad hydroxide anion-exchange resin and allowing the exchange to occur overnight. The resin was then removed by filtration and the resultant SDA solution was titrated to determine the hydroxide concentration.

Example 3

Synthesis of 1,5-bis(N-cyclohexylpyrrolidinium)pentane Dication

In a 250 mL round-bottom flask, 18.84 g N-cyclohexylpyrrolidine synthesized per Example 1 was dissolved in 75 mL acetone. Then 11.96 g 1,5-dibromopentane was added to the solution. The resultant solution was allowed to sit at room temperature for three weeks. The acetone was then removed by rotoevaporation. The resultant residues were then dissolved in isopropanol and the solution was then intermittently refluxed for 2-3 hour periods over the course of a week. After each refluxing period, the isopropanol was removed and the residues were washed with acetone. The product diquaternary ammonium salt then precipitated as a tan solid. The tan solid was then isolated by vacuum filtration. The resultant solid was then thoroughly rinsed with isopropanol to remove any reactant or monoquaternary products. The product was subsequently rinsed with acetone and then with ethyl ether.

After drying, the purity of the product salt was verified by 1H and 13C NMR. The filtrates were then combined and the refluxing of the isopropanol solutions was repeated to obtain additional product. The purified crops were then combined and ion-exchanged into the hydroxide form by dissolving the salts in water and adding a twofold excess of AG-1-X8 Biorad hydroxide anion-exchange resin and allowing the exchange to occur overnight. The resin was then removed by filtration and the resultant SDA solution was titrated with 0.1N HCl to determine the hydroxide concentration.

Example 4

Synthesis of 1,5-bis(N,N-dimethylcyclohexylammonium)pentane Dication 26.5 dimethylcyclohexylamine (Aldrich Chemical Company) was added to 100 mL methanol. Then 20.0 g 1,5-dibromopentane was added to the solution and stirred for 5 minutes. The solution was then allowed to remain at room temperature for 72 hours. Thereafter, the solution was then heated at 60'C' for 4 hours. The methanol was then removed by rotoevaporation and then about 100 mL acetone was added to the residue and mixed until precipitation of a solid product occurred. The solids were then recovered by filtration and washed with ether. The solids were allowed to air-dry. 1H and 13C NMR showed the product to be pure 1,5-bis(N,N-dimethylcyclohexylammonium)pentane within the limits of detection.

The dibromide salt was then ion-exchanged into the hydroxide form by dissolving the salts in water and adding a two-fold excess of AG-1-X8 hydroxide anion-exchange resin (Bio-Rad Laboratories, Inc.) and allowing the exchange to occur overnight. The resin was then removed by filtration and the resultant SDA solution was titrated with 0.100 N HCl to determine the hydroxide concentration.

Example 5

Synthesis of 1,4-bis(N-cyclohexylpiperidinium)butane Dication

In a Teflon liner for an 125 mL Steel Parr autoclave, 10.6 g N-cyclohexylpiperidine (Lancaster) was added to 50 mL acetonitrile. Then 6.19 g 1,4-dibromobutane was added to the mixture. The liner was then capped and sealed inside the autoclave. The sealed autoclave was then placed inside an oven and heated under static conditions at 75° C. for 5 days. The autoclave was then removed from the oven and allowed to cool to room temperature. The solid product from the reaction was then removed by filtration and washed with acetonitrile to remove undissolved HBr salts of N-cyclohexylpiperidine. The solids were then washed with acetone and ethyl ether and they were then allowed to dry to give about 8.75 g of the diquaternary product. After drying, the purity of the product salt was verified by 1H and 13C NMR. The purified crop was ion-exchanged into the hydroxide form by dissolving the salts in water and adding a two-fold excess of AG-1-X8 hydroxide anion-exchange resin (Bio-Rad Laboratories, Inc.) and allowing the exchange to occur overnight. The resin was then removed by filtration and the resultant SDA solution was titrated to determine the hydroxide concentration.

Example 6

Synthesis of
1,4-bis(N-cyclopentylpiperidinium)butane Dication 1-piperidino-1-cyclopentene was-synthesized as follows. In a 1-L 3-necked round-bottom flask equipped with an overhead stirrer, 20.0 g cyclopentanone was added to 120 mL hexane. 18.43 g piperidine was then added to the solution. 38.0 g anhydrous magnesium sulfate was then added to scavenge the water produced in the reaction, and 0.25 g p-toluenesulfonic acid was added as a catalyst. The mixture was then refluxed with overhead stirring over the course of 4 days. The suspension was allowed to cool, and the magnesium salts were removed by filtration. The hexane solution was then rotoevaporated at about 77° C. and 60 torr in order to remove the hexane solvent and unreacted piperidine.

The hydrogenation of the enamine, 1-piperidino-1-cyclopentene, to N-cyclopentylpiperidine was carried out according to the teachings in Example 7 of U.S. Pat. No. 6,544,495 to Saleh Elomari, issued Apr. 8, 2003.

The 1,4-bis(N-cyclopentylpiperidinium)butane dication was-synthesized as follows. In a Teflon liner for an 125 mL Steel Parr autoclave, 20.96 g N-cyclopentylpiperidine was added to 60 mL acetonitrile. Then 11.33 g 1,4-dibromobutane was added to the mixture. The liner was then capped and sealed inside the autoclave. The sealed autoclave was then placed inside an oven and heated under static conditions at 75° C. for 5 days. The autoclave was then removed from the oven and allowed to cool to room temperature. The solid product from the reaction was then removed by filtration and washed with acetone to remove the solvent, unreacted material, or monoquaternary product. The solids were then washed with ethyl ether and allowed to dry.

After drying, the purity of the product salt was checked by 1H and 13C NMR. The initial product showed a minor amount of the HBr salt of N-cyclopentylpiperidine that was formed as a result of the dehydrohalogenation of the dibromoalkane. The product was further purified by slurrying the solids in a minimum amount of a concentrated aqueous solution of ammonium hydroxide. The suspension was then extracted with ethyl ether to remove the N-cyclopentylpiperidine, and the suspension was then extracted with chloroform to isolate 18.83 g of the desired product after rotoevaporation of the chloroform solvent. The product was subsequently rinsed with acetone and then with ethyl ether.

After drying, the purity of the product salt was verified by 1H and $^{13}$C NMR. The purified crop was ion-exchanged into the hydroxide form by dissolving the salts in water and adding a two-fold excess of AG-1-X8 hydroxide anion-exchange resin (Bio-Rad Laboratories, Inc.) and allowing the exchange to occur overnight. The resin was then removed by filtration and the resultant SDA solution was titrated to determine the hydroxide concentration.

Synthesis of Borosilicate SSZ-33 Using
1,4-bis(N-cyclohexylpyrrolidinium)butane Dication Example 7

3.62 g of a hydroxide solution of 1,4-bis(N-cyclohexylpyrrolidinium)butane ([OH$^-$]=0.50 mmol/g) synthesized per Example 2, 0.72 g 1 N sodium hydroxide, and 4.43 g deionized water were mixed together in a Teflon liner. Then, 0.036 g sodium borate decahydrate was dissolved in the solution. Next, 0.54 g CAB-O-SIL M-5 fumed silica (Cabot Corporation) was added to the solution and mixed to create a uniform gel. The liner was then capped and placed within a Parr Steel autoclave reactor. The autoclave was then fixed in a rotating spit (43 rpm) within an oven heated at 160° C. for 7 days. The solid products were recovered from the cooled reactor by vacuum filtration and washed with copious quantities of water.

The resulting zeolite product was analyzed by powder XRD. The resulting powder XRD pattern is shown in FIG. 1 and indicates the material was a member of the SSZ-26/33 family. Table 11 below shows the powder X-ray diffraction lines for the resulting zeolite product.

TABLE 11

| 2 Theta[a] | d-spacing (Angstroms) | Relative Absolute Intensity (%) |
|---|---|---|
| 7.18 | 12.30 | 1.6 |
| 7.87 | 11.22 | 100.0 |
| 8.35 | 10.58 | 10.5 |
| 14.24 | 6.21 | 12.8 |
| 15.80 | 5.61 | 7.4 |
| 16.82 | 5.27 | 2.2 |
| 19.86 | 4.47 | 8.6 |
| 20.07 | 4.42 | 9.3 |
| 20.56 | 4.32 | 82.0 |
| 21.55 | 4.12 | 26.7 |
| 22.13 | 4.01 | 57.2 |
| 23.17 | 3.84 | 95.4 |
| 25.37 | 3.51 | 12.0 |
| 26.96 | 3.30 | 27.4 |
| 28.79 | 3.10 | 7.2 |
| 29.36 | 3.04 | 5.8 |
| 29.93 | 2.98 | 2.1 |
| 30.69 | 2.91 | 8.1 |
| 31.88 | 2.80 | 5.2 |
| 32.37 | 2.76 | 4.5 |
| 33.50 | 2.67 | 7.8 |
| 35.83 | 2.50 | 6.2 |
| 36.27 | 2.47 | 2.6 |
| 36.62 | 2.45 | 2.0 |
| 37.25 | 2.41 | 4.5 |
| 37.62 | 2.39 | 0.8 |
| 40.97 | 2.20 | 4.1 |

[a]±0.20

The resulting zeolite product was calcined inside a muffle furnace under a flow of 2% oxygen/98% nitrogen heated to 595° C. at a rate of 1° C./min and held at 595° C. for five hours and then analyzed by powder XRD. Table 12 below shows the powder X-ray diffraction lines for the calcined zeolite product.

TABLE 12

| 2 Theta(a) | d-spacing (Angstroms) | Relative Absolute Intensity (%) |
|---|---|---|
| 7.12 | 12.41 | 2.2 |
| 7.86 | 11.25 | 100 |
| 8.30 | 10.65 | 11.2 |
| 13.37 | 6.62 | 2.9 |
| 14.27 | 6.20 | 4.8 |
| 14.98 | 5.91 | 2.1 |
| 15.77 | 5.62 | 1.4 |
| 16.87 | 5.25 | 2 |
| 20.15 | 4.40 | 3.2 |
| 20.51 | 4.33 | 33.2 |
| 21.54 | 4.12 | 8.6 |
| 22.13 | 4.01 | 21.3 |
| 23.28 | 3.82 | 34.2 |
| 25.43 | 3.50 | 4.5 |
| 26.88 | 3.31 | 11.2 |
| 28.75 | 3.10 | 2.5 |
| 29.28 | 3.05 | 2.8 |
| 30.83 | 2.90 | 2.4 |
| 31.85 | 2.81 | 0.9 |
| 32.33 | 2.77 | 1.1 |
| 33.57 | 2.67 | 2.5 |
| 35.85 | 2.50 | 1.7 |
| 37.23 | 2.41 | 1.4 |
| 40.75 | 2.21 | 1.1 |

(a)±0.20

Example 8

The procedure from Example 7 was repeated except 0.052 g sodium borate decahydrate was used (instead of 0.036 g sodium borate decahydrate) and 0.03 g of SSZ-33 seeds was added. The product was recovered after 7 days, and XRD showed the material was similar to that prepared in Example 7.

Example 9

The procedure from Example 7 was repeated except 0.02 g seeds from Example 7 were added and the synthesis was carried out at 170° C. instead of 160° C. The autoclave was removed from the oven after 48 hours (rather than 7 days). Powder XRD indicated the product to be like the product produced in Example 7.

Example 10

The procedure from Example 9 was followed except that 0.144 g sodium borate decahydrate were used (instead of 0.036 g sodium borate decahydrate). Powder XRD indicated the product to be like the product produced in Example 7. Table 13 below shows the powder X-ray diffraction lines for the resulting zeolite product.

TABLE 13

| 2 Theta(a) | d-spacing (Angstroms) | Relative Absolute Intensity (%) |
|---|---|---|
| 7.31 | 12.08 | 1.8 |
| 7.92 | 11.15 | 91.8 |
| 8.40 | 10.52 | 11.1 |
| 14.31 | 6.18 | 10.7 |
| 15.90 | 5.57 | 7.2 |
| 16.95 | 5.23 | 2.0 |
| 20.11 | 4.41 | 11.6 |
| 20.63 | 4.30 | 79.8 |
| 21.66 | 4.10 | 24.0 |
| 22.23 | 4.00 | 55.9 |
| 23.23 | 3.83 | 100.0 |
| 25.50 | 3.49 | 11.5 |
| 27.05 | 3.29 | 31.3 |
| 28.91 | 3.09 | 8.7 |
| 29.28 | 3.05 | 4.7 |
| 30.88 | 2.89 | 6.0 |
| 32.03 | 2.79 | 4.5 |
| 32.37 | 2.76 | 4.1 |
| 33.65 | 2.66 | 7.9 |
| 35.97 | 2.49 | 6.5 |
| 36.30 | 2.47 | 3.8 |
| 36.89 | 2.43 | 3.7 |
| 37.43 | 2.40 | 5.5 |
| 40.99 | 2.20 | 5.2 |

(a)±0.20

The resulting zeolite product was calcined inside a muffle furnace under a flow of 2% oxygen/98% nitrogen heated to 595° C. at a rate of 1° C./min and held at 595° C. for five hours and then analyzed by powder XRD. Table 14 below shows the powder X-ray diffraction lines for the calcined zeolite product.

TABLE 14

| 2 Theta(a) | d-spacing (Angstroms) | Relative Absolute Intensity (%) |
|---|---|---|
| 7.28 | 12.13 | 2.8 |
| 7.91 | 11.16 | 100 |
| 8.36 | 10.56 | 8.6 |
| 13.43 | 6.59 | 4.4 |
| 14.29 | 6.19 | 6.5 |
| 14.95 | 5.92 | 2.2 |
| 15.90 | 5.57 | 1.8 |
| 16.91 | 5.24 | 2.2 |
| 20.20 | 4.39 | 5.3 |
| 20.61 | 4.31 | 44.8 |
| 21.62 | 4.11 | 12.3 |
| 22.20 | 4.00 | 32.4 |
| 23.32 | 3.81 | 50.1 |
| 25.43 | 3.50 | 6.9 |
| 27.02 | 3.30 | 19.6 |
| 28.88 | 3.09 | 5.2 |
| 29.32 | 3.04 | 4.7 |
| 29.97 | 2.98 | 1.4 |
| 30.84 | 2.90 | 3.9 |
| 31.93 | 2.80 | 2 |
| 32.59 | 2.75 | 1.2 |
| 33.68 | 2.66 | 4.1 |
| 35.92 | 2.50 | 2.8 |
| 37.45 | 2.40 | 2.6 |
| 40.97 | 2.20 | 3 |

(a)±0.20

Example 11

The procedure from Example 9 was followed except that 0.072 g sodium borate decahydrate were used (instead of 0.036 g sodium borate decahydrate). The reaction was allowed to proceed for 3 days at 160° C. Powder XRD indicated the product to be like that produced in Example 7.

Example 12

0.47 g of the 1,4-bis(N-cyclohexylpyrrolidinium)butane dibromide salt intermediate of Example 2, 2.02 g 1 N sodium hydroxide, and 6.04 g deionized water were mixed together in a Teflon liner. Then 0.036 g sodium borate decahydrate was dissolved in the solution. Next 0.54 g CAB-O-SIL M-5 fumed silica (Cabot Corporation) was added to the solution and mixed to create a uniform gel. Next 0.02 g of zeolite seeds from Example 8 were mixed into the gel. The liner was then capped and placed within a Parr Steel autoclave reactor. The autoclave was then fixed in a rotating spit (43 rpm) within an oven heated at 160° C. for 2 days. The solid products were recovered from the cooled reactor by vacuum filtration and washed with copious quantities of water. The powder X-ray diffraction indicated the material was a member of the SSZ-26/33 family.

Example 13

The procedure from Example 12 was repeated except 0.144 g sodium borate decahydrate were used instead of the 0.036 g sodium borate decahydrate, and the reaction was performed for 4 days at 160° C.

Figure 2:
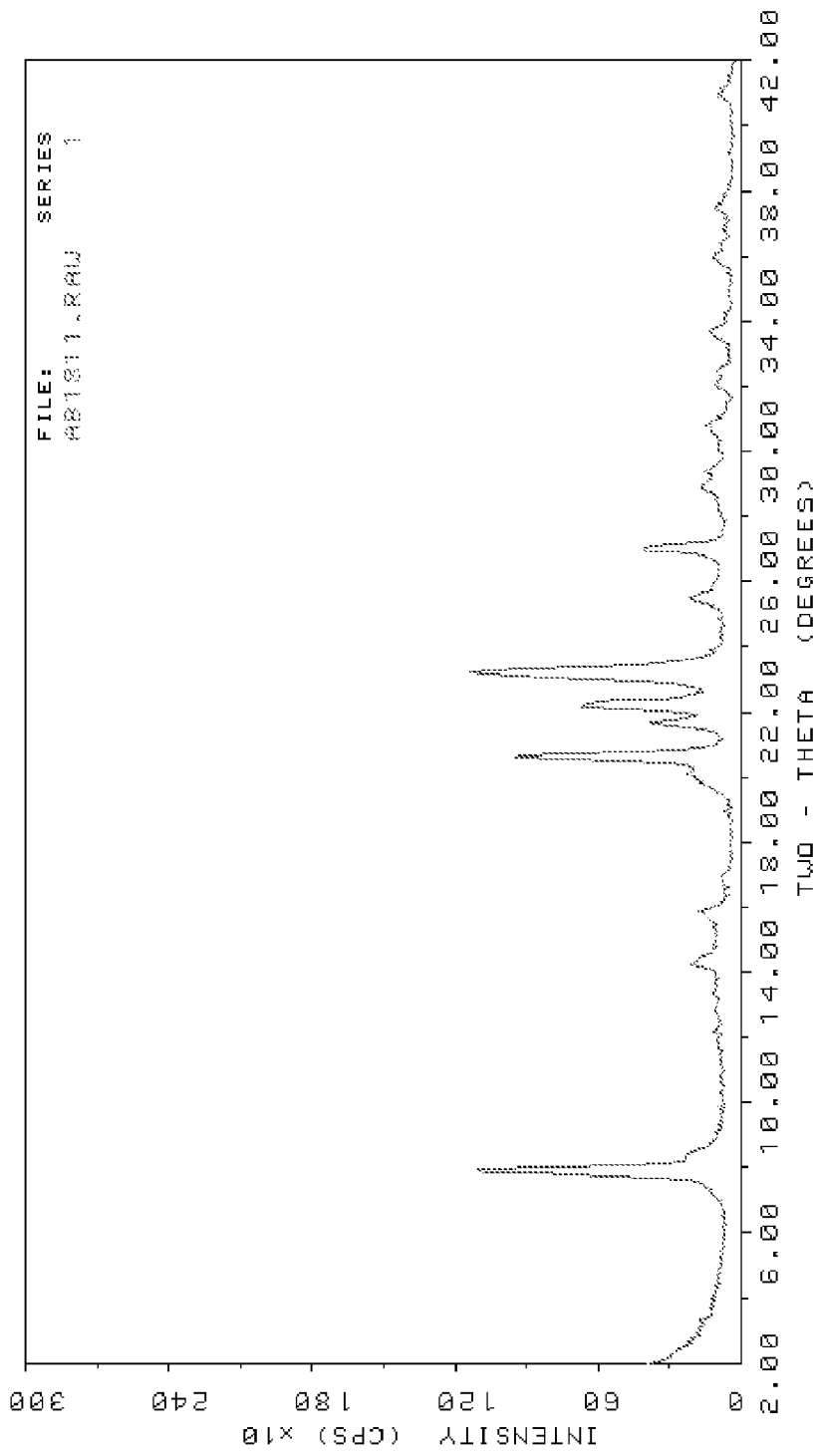
FIG. 2 shows the results of a powder XRD analysis of the zeolite prepared in Example 13.
Figure 3:
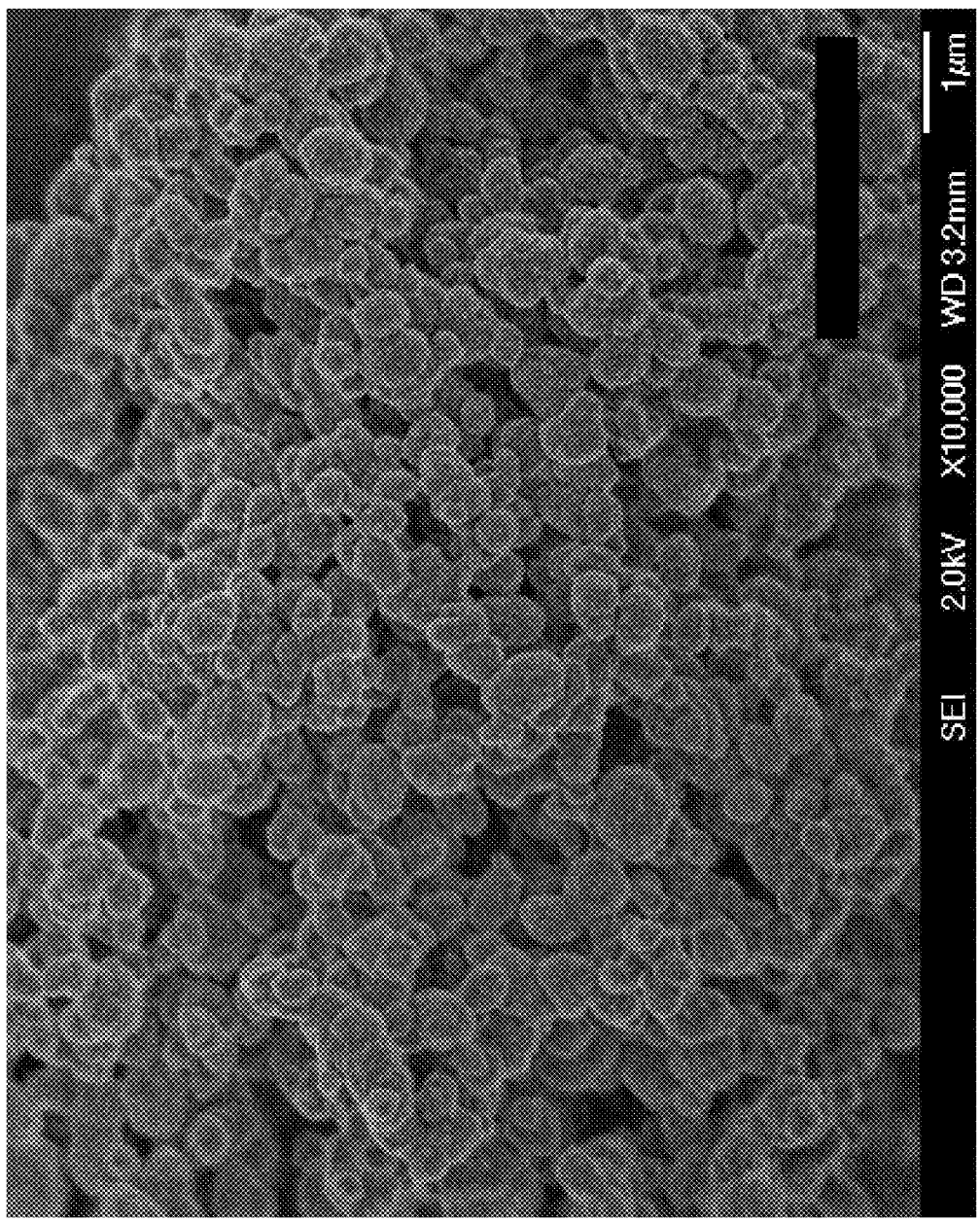
FIG. 3 shows the results of a scanning electron microscopy (SEM) analysis of the zeolite prepared in Example 13.
Figure 4:
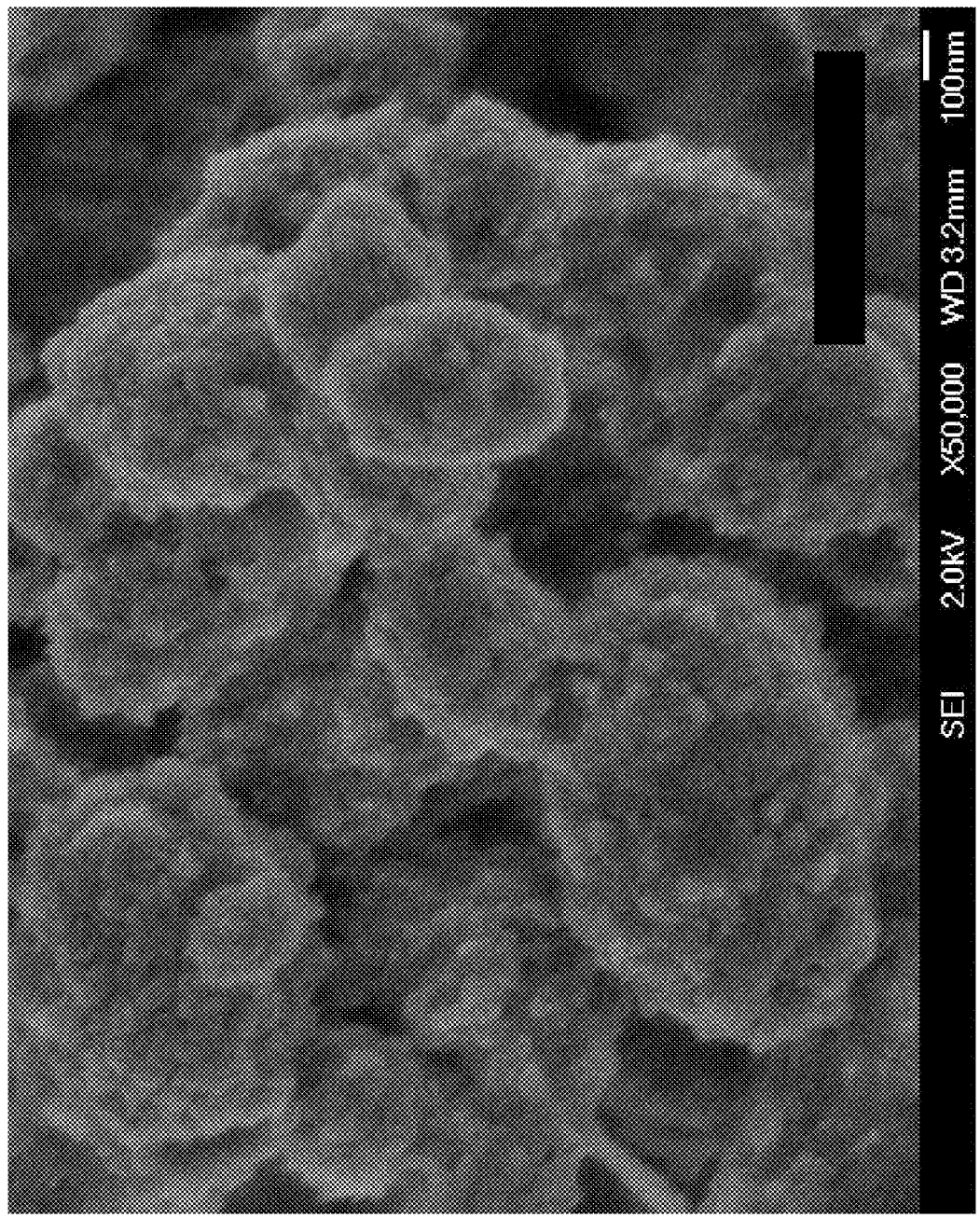
FIG. 4 also shows the results of a SEM analysis of the zeolite prepared in Example 13.

The resulting zeolite product was analyzed by powder XRD and SEM. The resulting XRD pattern is shown in FIG. 2. Powder XRD indicated the sample was SSZ-33. The SEM images are shown in FIGS. 3 and 4.

Synthesis of Aluminosilicate SSZ-26 Using 1,4-bis(N-cyclohexylpyrrolidinium)butane Dication

Example 14

6.87 g of a hydroxide solution of 1,4-bis(N-cyclohexylpyrrolidinium)butane ([OH$^-$]=0.50 mmol/g) synthesized per Example 2, 3.00 g 1 N sodium hydroxide, and 1.09 g deionized water were mixed together in a Teflon liner. Next 0.54 g CAB-O-SIL M-5 fumed silica (Cabot Corporation) and 0.25 g LZY-62 zeolite Y were added to the solution and mixed to create a uniform gel. 0.05 g of seeds from Example 19 below were then added to the gel. The liner was then capped and placed within a Parr Steel autoclave reactor. The autoclave was then fixed in a rotating spit (43 rpm) within an oven heated at 160° C. for 7 days. The solid products were recovered from the cooled reactor by vacuum filtration and washed with copious quantities of water.

Figure 5:
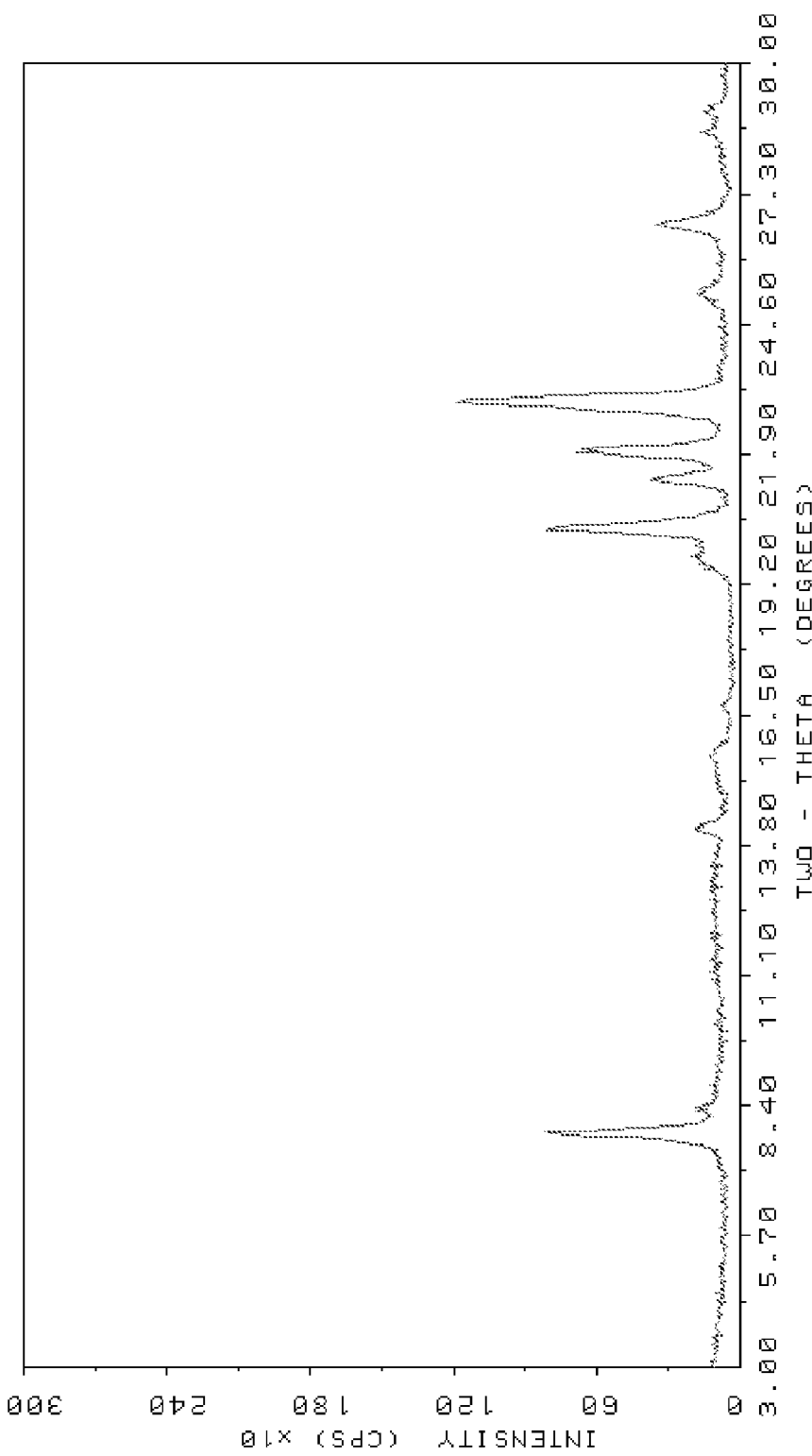
FIG. 5 shows the results of a powder XRD analysis of the zeolite prepared in Example 14.
Figure 6:
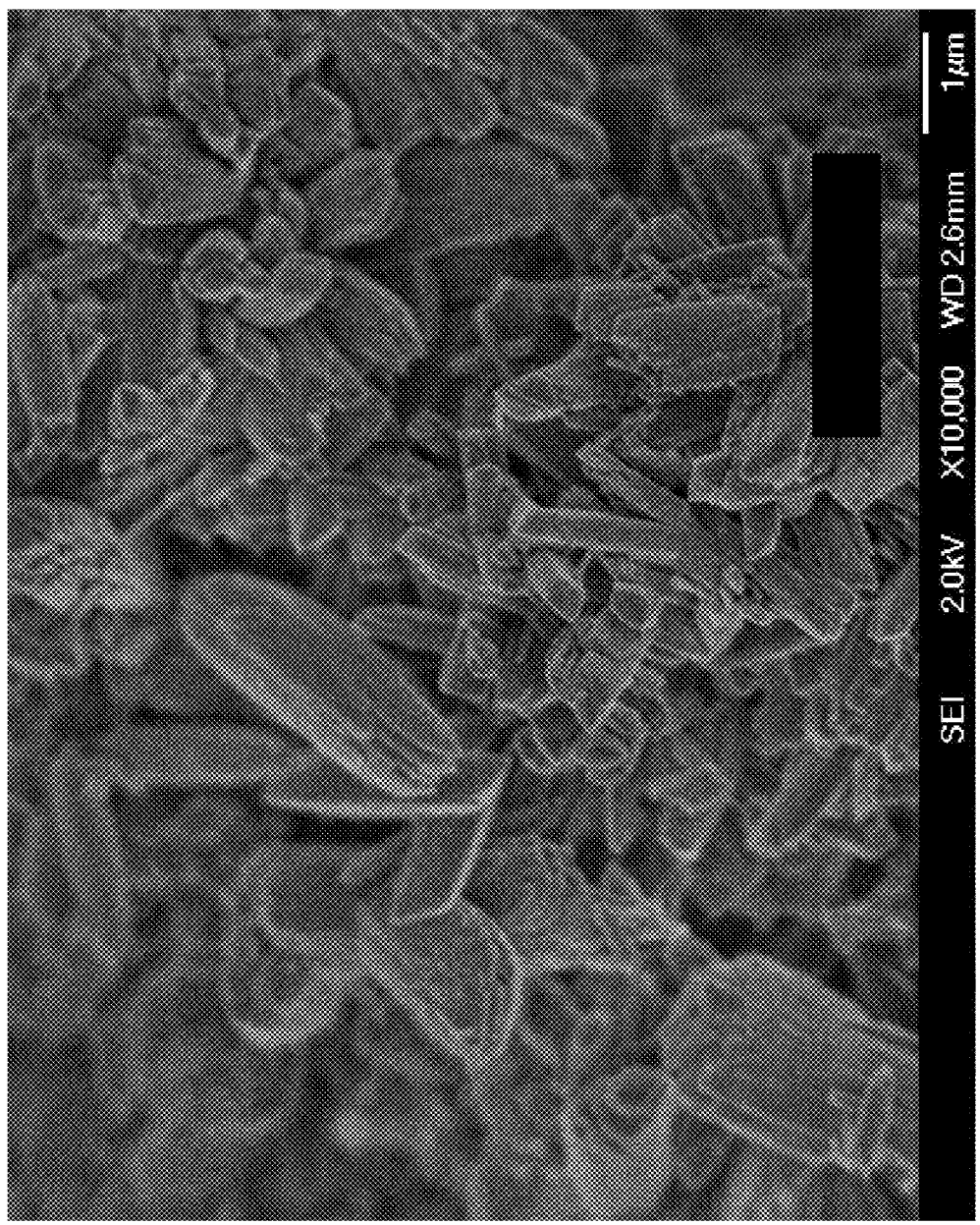
FIG. 6 shows the results of a SEM analysis of the zeolite prepared in Example 14.

The resulting zeolite product was analyzed by powder XRD and SEM. The resulting XRD pattern is shown in FIG. 5. Powder XRD indicated the sample was a member of the SSZ-26/33 family. FIG. 6 shows an SEM image of the product.

Example 15

The procedure from Example 14 was repeated except that 0.03 g seeds from that example were included in the gel and the synthesis was performed at 170° C. for 4 days. The powder XRD pattern indicated the product was an SSZ-26 type product with minor zeolite Y impurity.

Example 16

The procedure from Example 15 was repeated except that the reaction was heated at a temperature of 165° C. for 5 days. The powder XRD pattern indicated the product was a pure SSZ-26-type product. The Si/Al (by ICP methods) of the as-made product was 14.0. The carbon, hydrogen, and nitrogen contents by CHN combustion analyses were 13.4%, 2.1%, and 1.34%, respectively.

Example 17

220.7 g of a hydroxide solution of 1,4-bis(N-cyclohexylpyrrolidinium)butane ([OH$^-$]=0.62 mmol/g) synthesized per Example 2, 120.0 g 1 N sodium hydroxide, and 97.7 g deionized water were mixed together in a Teflon liner insert for a 1-L steel Parr autoclave reactor equipped with an overhead stirrer. Next 32.0 g CAB-O-SIL M-5 fumed silica (Cabot Corporation) and 10.0 g LZY-62 zeolite Y were added to the solution and mixed to create a uniform gel. 2.0 g zeolite seeds (prepared according to a procedure in Example 16) were added to the gel. The liner was then sealed within the Parr Steel autoclave reactor. The overhead stirrer spun at a rate of 200 rpm. The autoclave was heated to 165° C. over an 8 hour period and then allowed to remain at 165° C. for 108 hours. The solid products were recovered from the cooled reactor by vacuum filtration and washed with copious quantities of water. The solids were then allowed to dry in an oven at 95° C. for over 12 hours. The total yield of the as-made solid product was 41.93 g.

Figure 7:
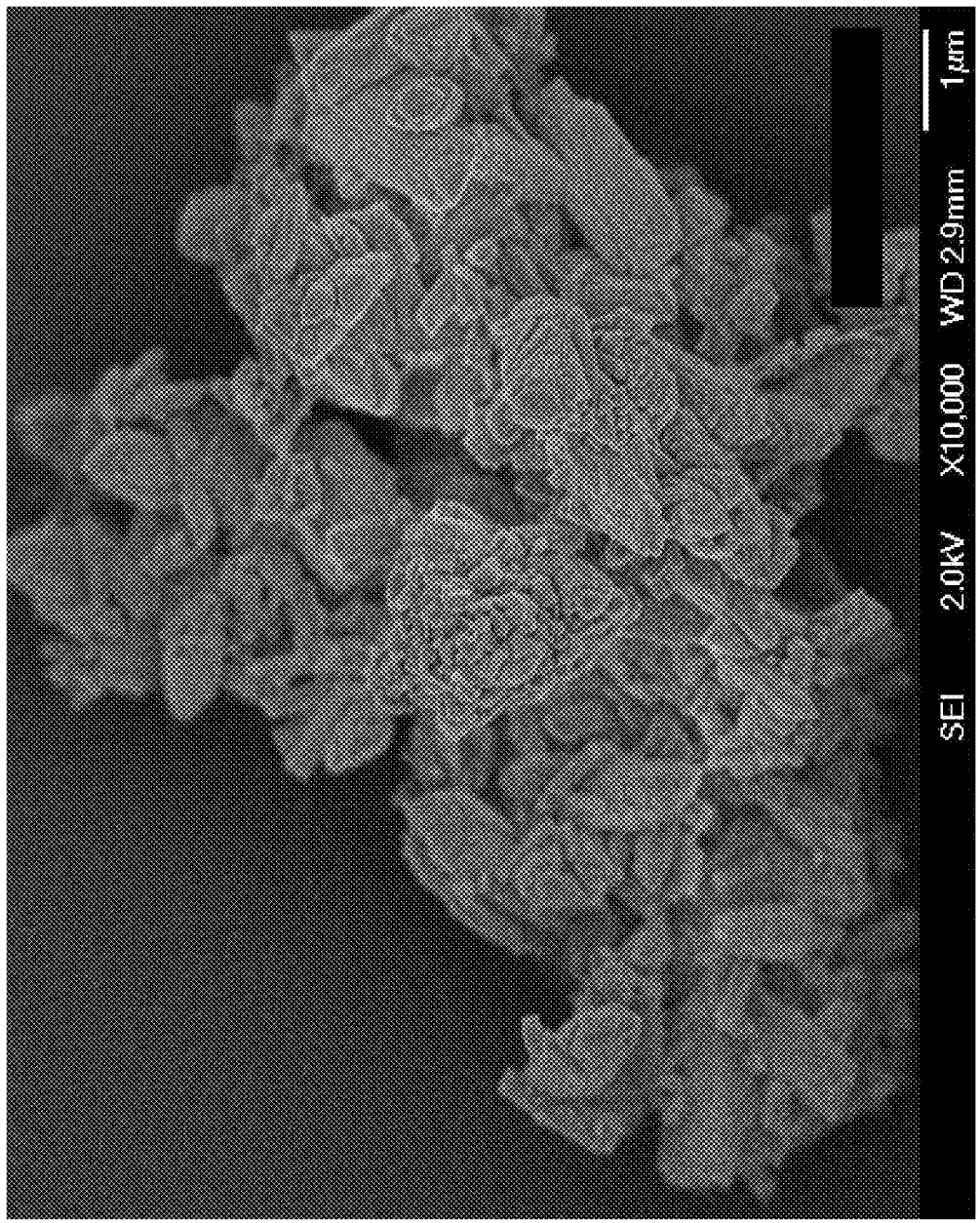
FIG. 7 shows the results of a SEM analysis of the zeolite prepared in Example 17.

The resulting zeolite product was analyzed by powder XRD and SEM. The powder X-ray diffraction indicated the product was a pure SSZ-26 type zeolite. FIG. 7 shows an SEM micrograph of the product. Table 15 below shows the Powder X-ray diffraction lines for the resulting zeolite product.

TABLE 15

| 2 Theta$^{(a)}$ | d-spacing (Angstroms) | Relative Absolute Intensity (%) |
|---|---|---|
| 7.77 | 11.37 | 100.0 |
| 8.21 | 10.76 | 7.2 |
| 14.11 | 6.27 | 10.1 |
| 15.23 | 5.81 | 3.3 |
| 15.56 | 5.69 | 3.8 |
| 16.63 | 5.33 | 2.4 |
| 19.64 | 4.52 | 10.9 |
| 19.90 | 4.46 | 6.6 |
| 20.27 | 4.38 | 69.4 |
| 21.32 | 4.16 | 26.0 |
| 21.92 | 4.05 | 53.0 |
| 22.76 | 3.90 | 46.2 |
| 22.92 | 3.88 | 98.9 |
| 25.14 | 3.54 | 8.6 |
| 26.41 | 3.37 | 7.3 |
| 26.53 | 3.36 | 27.9 |
| 27.69 | 3.22 | 1.2 |
| 28.47 | 3.13 | 6.6 |
| 29.02 | 3.07 | 4.4 |
| 30.39 | 2.94 | 6.9 |
| 31.51 | 2.84 | 4.8 |
| 32.01 | 2.79 | 3.9 |
| 33.19 | 2.70 | 7.1 |
| 35.30 | 2.54 | 6.1 |
| 36.93 | 2.43 | 3.9 |
| 40.23 | 2.24 | 3.0 |

$^{(a)}$±0.20

The resulting zeolite product was calcined inside a muffle furnace under a flow of 2% oxygen/98% nitrogen heated to 595° C. at a rate of 1° C./min and held at 595° C. for five hours and then analyzed by powder XRD. Table 16 below shows the Powder X-ray diffraction lines for the calcined zeolite product.

TABLE 16

| 2 Theta[a] | d-spacing (Angstroms) | Relative Absolute Intensity (%) |
|---|---|---|
| 7.16 | 12.33 | 1.2 |
| 7.75 | 11.40 | 100 |
| 8.22 | 10.75 | 6.7 |
| 8.95 | 9.87 | 2.7 |
| 13.11 | 6.75 | 6.8 |
| 14.12 | 6.27 | 5.6 |
| 14.99 | 5.91 | 1.5 |
| 15.62 | 5.67 | 2 |
| 16.66 | 5.32 | 3.4 |
| 19.72 | 4.50 | 3.1 |
| 20.21 | 4.39 | 36.7 |
| 21.29 | 4.17 | 8.6 |
| 21.93 | 4.05 | 31.3 |
| 22.87 | 3.89 | 23.5 |
| 23.07 | 3.85 | 53.2 |
| 25.22 | 3.53 | 8.5 |
| 25.72 | 3.46 | 1.8 |
| 26.49 | 3.36 | 25.5 |
| 27.62 | 3.23 | 0.9 |
| 28.49 | 3.13 | 6.9 |
| 28.92 | 3.08 | 8.3 |
| 29.65 | 3.01 | 2.1 |
| 30.46 | 2.93 | 5.1 |
| 31.40 | 2.85 | 4.3 |
| 32.10 | 2.79 | 2 |
| 33.30 | 2.69 | 7 |
| 35.40 | 2.53 | 4.8 |
| 35.73 | 2.51 | 1.8 |
| 36.31 | 2.47 | 2.1 |
| 36.83 | 2.44 | 3.5 |
| 37.41 | 2.40 | 1.6 |
| 40.18 | 2.24 | 2.8 |

[a] ±0.20

Synthesis of Aluminosilicate SSZ-26 Using 1,5-bis(N-cyclohexylpyrrolidinium)pentane Dication

Example 18

2.28 g of a hydroxide solution of 1,5-bis(N-cyclohexylpyrrolidinium)pentane ([OH⁻]=0.56 mmol/g) synthesized per Example 3, 0.86 g 1 N sodium hydroxide, and 1.18 g deionized water were mixed together in a Teflon liner. Next 0.48 g CAB-O-SIL M-5 fumed silica (Cabot Corporation) and 0.15 g LZY-52 zeolite Y were added to the solution and mixed to create a uniform gel. The liner was then capped and placed within a Parr Steel autoclave reactor. The autoclave was then fixed in a rotating spit (43 rpm) within an oven heated at 160° C. for 26 days. The solid products were recovered from the cooled reactor by vacuum filtration and washed with copious quantities of Water. Powder XRD indicated the product to be zeolite Y, layered material, minor cristobalite, and minor SSZ-26 type zeolite.

Example 19

Example 18 was repeated using 0.03 g of the product from Example 18 as seeds. The reaction was allowed to proceed for 18 days rather than 26 days. Powder XRD showed the product to be major SSZ-26 type product, zeolite Y, and minor layered material.

Example 20

6.07 g of a hydroxide solution of 1,5-bis(N-cyclohexylpyrrolidinium)pentane ([OH⁻]=0.56 mmol/g) synthesized per Example 3, 3.00 g 1 N sodium hydroxide, and 1.89 g deionized water were mixed together in a Teflon liner. Next 0.80 g CAB-O-SIL M-5 fumed silica (Cabot Corporation) and 0.25 g LZY-62 zeolite Y were added to the solution and mixed to create a uniform gel. 0.05 g of seeds from Example 19 were then added to the gel. The liner was then capped and placed within a Parr Steel autoclave reactor. The autoclave was then fixed in a rotating spit (43 rpm) within an oven heated at 160° C. for 18 days. The solid products were recovered from the cooled reactor by vacuum filtration and washed with copious quantities of water. Powder XRD indicated the product to be like that produced to be major SSZ-26 product with layered impurities and zeolite Y.

Example 21

3.05 g of a hydroxide solution of 1,5-bis(N-cyclohexylpyrrolidinium)pentane ([OH⁻]=0.56 mmol/g) synthesized per Example 3, 1.50 g 1 N sodium hydroxide, and 1.21 g deionized water were mixed together in a Teflon liner. Next 0.40 g CAB-O-SIL M-5 fumed silica (Cabot Corporation) and 0.125 g LZY-62 zeolite Y were added to the solution and mixed to create a uniform gel. The liner was then capped and placed within a Parr Steel autoclave reactor. The autoclave was then fixed in a rotating spit (43 rpm) within an oven heated at 160° C. for 21 days. Powder XRD indicated the product was major SSZ-26 type product with mordenite and quartz impurities.

Synthesis of Borosilicate SSZ-33 Using 1,5-bis(N,N-dimethylcyclohexylammonium)pentane Dication

Example 22

3.35 g of a hydroxide solution of 1,5-bis(N,N-dimethylcyclohexylammonium)pentane ([OH-]=0.54 mmol/g) synthesized per Example 4, 0.72 g 1N sodium hydroxide, and 4.29 g deionized water were mixed together in a Teflon liner. Then 0.036 g sodium borate decahydrate was dissolved into solution. Next 0.54 g CAB-O-SIL M-5 fumed silica (Cabot Corporation) was added to the solution and mixed to create a uniform gel. The liner was then capped and placed within a Parr Steel autoclave reactor. The autoclave was then fixed in a rotating spit (43 rpm) within an oven heated at 160° C. for 14 days. The solid products were recovered from the cooled reactor by vacuum filtration and washed with copious quantities of water.

Figure 8:
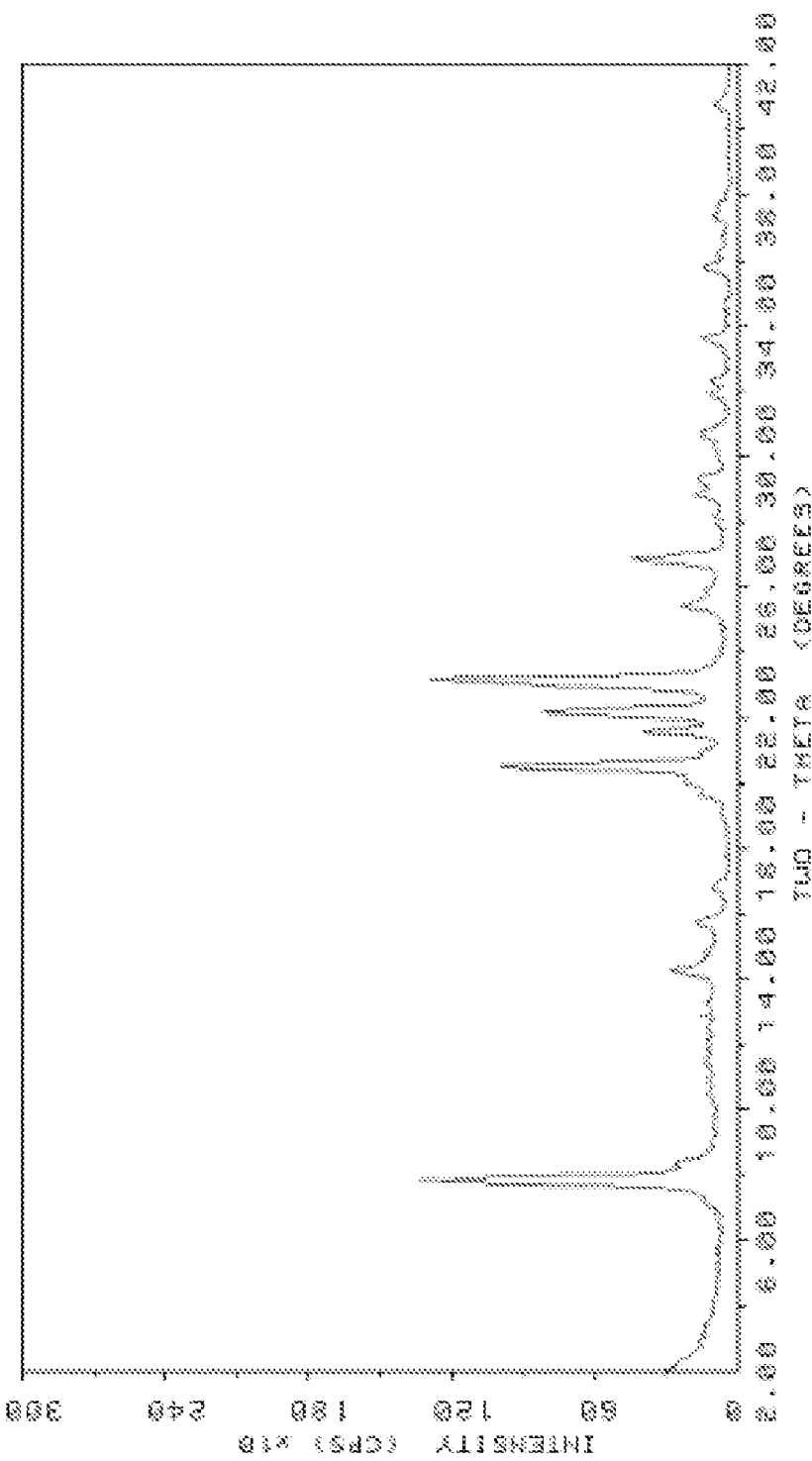
FIG. 8 shows the results of a powder XRD analysis of the zeolite prepared in Example 22.
Figure 9:
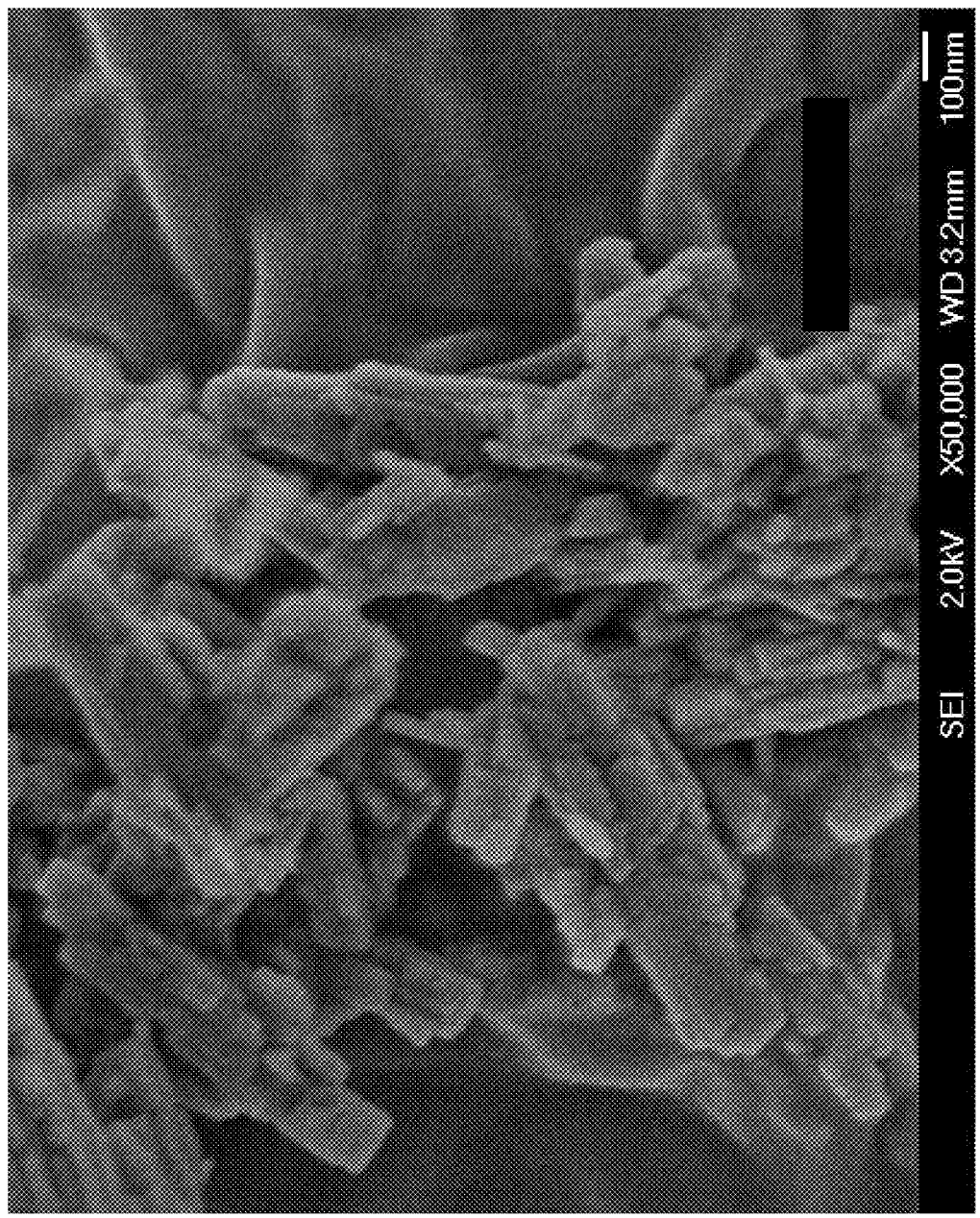
FIG. 9 shows the results of a SEM analysis of the zeolite prepared in Example 22.

The resulting zeolite product was analyzed by powder XRD and SEM. The resulting XRD pattern is shown in FIG. 8. Powder XRD indicated the sample was pure SSZ-33. FIG. 9 shows the SEM images of the product.

Example 23

2.36 g of a hydroxide solution of 1,5 bis(N,N-dimethylcyclohexylammonium)pentane ([OH⁻]=0.54 mmol/g) synthesized per Example 4, 0.86 g 1N sodium hydroxide, and 2.54 g deionized water were mixed together in a Teflon liner. Next 0.48 g CAB-O-SIL M-5 fumed silica (Cabot Corporation) and 0.15 g LZY-52 zeolite Y were added to the solution and mixed to create a uniform gel. The liner was then capped and placed within a Parr Steel autoclave reactor. The autoclave was then fixed in a rotating spit (43 rpm) within an oven heated at 160° C. for 14 days. The solid products were recovered from the cooled reactor by vacuum filtration and washed with copious quantities of water. The powder X-ray diffraction pattern indicated the material was pure Nu-87.

Synthesis of Borosilicate SSZ-33 Using
1,4-bis(N-cyclohexylpiperidinium)butane Dication Example 24

Figure 10:
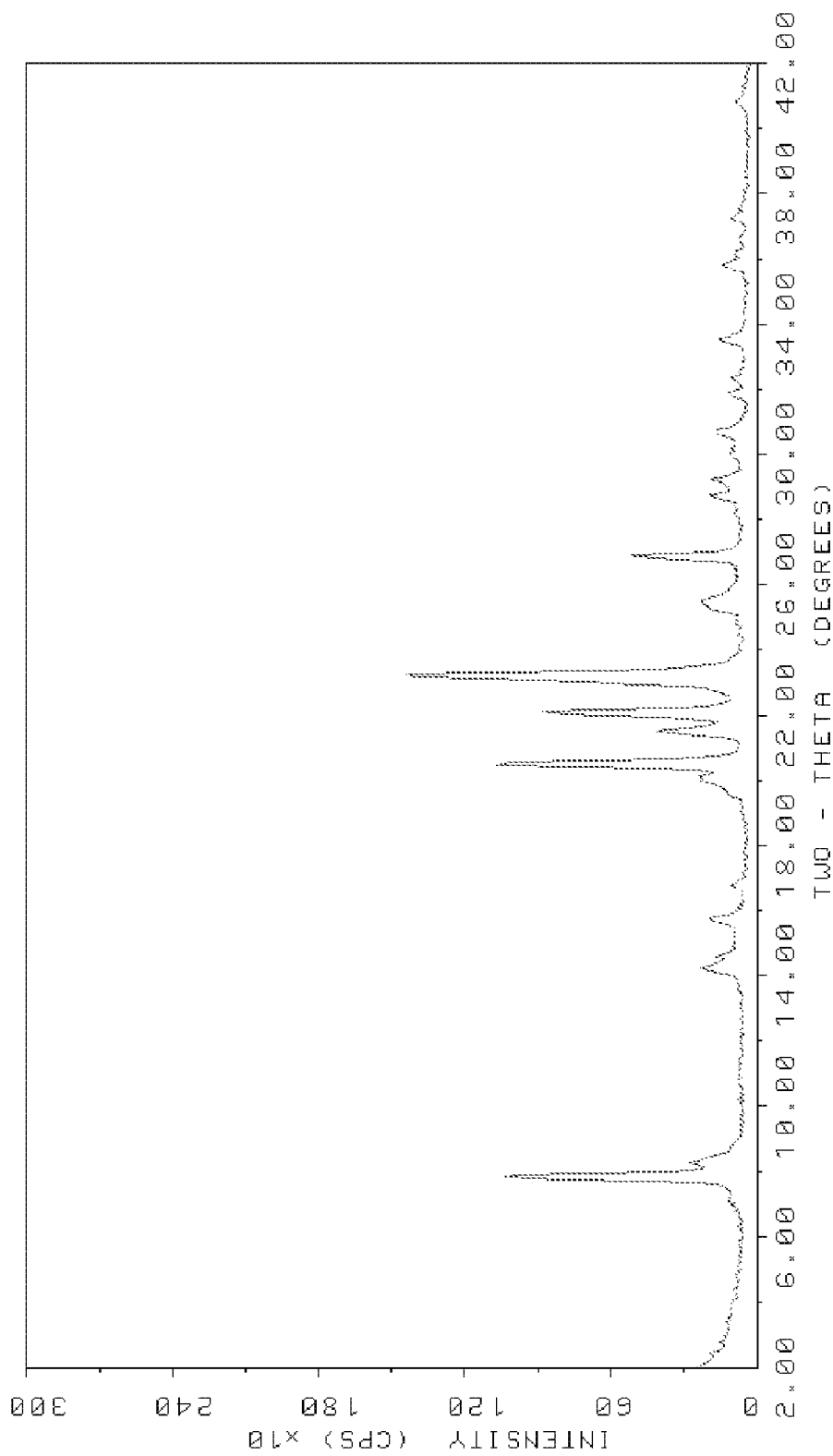
FIG. 10 shows the results of a powder XRD analysis of the zeolite prepared in Example 24.

3.52 g of a hydroxide solution of 1,4-bis(N-cyclohexylpiperidinium)butane ([OH⁻]=0.51 mmol/g) synthesized per Example 5, 0.72 g 1 N sodium hydroxide, and 4.12 g deionized water were mixed together in a Teflon liner. Then 0.036 g sodium borate decahydrate was dissolved in the solution. Next 0.54 g CAB-O-SIL M-5 fumed silica (Cabot Corporation) was added to the solution and mixed to create a uniform gel. The liner was then capped and placed within a Parr Steel autoclave reactor. The autoclave was then fixed in a rotating spit (43 rpm) within an oven heated at 160° C. for 5 days. The solid products were recovered from the cooled reactor by vacuum filtration and washed with copious quantities of water. The resulting zeolite product was analyzed by powder XRD. The resulting XRD pattern is shown in FIG. 10. The powder X-ray diffraction indicated the material was a member of the SSZ-26/33 family.

Synthesis of Borosilicate SSZ-33 Using
1,4-bis(N-cyclopentylpiperidinium)butane Dication Example 25

3.30 g of a hydroxide solution of 1,4-bis(N-cyclopentylpiperidinium)butane ([OH⁻]=0.54 mmol/g) synthesized per Example 6, 0.72 g 1 N sodium hydroxide, and 4.34 g deionized water were mixed together in a Teflon liner. Then 0.0369 sodium borate decahydrate was dissolved in the solution. Next 0.54 g CAB-O-SIL M-5 fumed silica (Cabot Corporation) was added to the solution and mixed to create a uniform gel. The liner was then capped and placed within a Parr Steel autoclave reactor. The autoclave was then fixed in a rotating spit (43 rpm) within an oven heated at 160° C. for 7 days. The solid products were recovered from the cooled reactor by vacuum filtration and washed with copious quantities of water. The resulting zeolite product was analyzed by powder XRD. The powder X-ray diffraction pattern indicated the material was a member of the SSZ-26/33 family.

Synthesis of Aluminosilicate SSZ-26 Using
1,4-bis(N-cyclohexylpiperidinium)butane Dication Example 26

2.48 g of a hydroxide solution of 1,4-bis(N-cyclohexylpiperidinium)butane ([OH⁻]=0.51 mmol/g) synthesized per Example 5, 1.50 g 1 N sodium hydroxide, and 2.06 g deionized water were mixed together in a Teflon liner. Then 0.40 g CAB-β-SIL M-5 fumed silica (Cabot Corporation) and 0.125 g LZY-52 zeolite Y were added to the solution and mixed to create a uniform gel. The liner was then capped and placed within a Parr Steel autoclave reactor. The autoclave was then fixed in a rotating spit (43 rpm) within an oven heated at 160° C. for 14 days. The solid products were recovered from the cooled reactor by vacuum filtration and washed with copious quantities of water. The resulting zeolite product was analyzed by powder XRD. The powder X-ray diffraction pattern indicated the recovered product was a mixture of SSZ-26, zeolite Y, and a layered material.

Example 27

Example 26 was repeated except 0.03 g SSZ-26 seeds were added to the gel mixture and the synthesis was heated at 160° C. for only 7 days. The resulting zeolite product was analyzed by powder XRD. Powder XRD pattern showed the product to be SSZ-26 with minor analcime impurity.

What is claimed is:

1. A process for preparing a zeolite, belonging to SSZ 26/33 family of zeolites comprising:

(a) preparing a reaction mixture comprising (1) at least one active source of an oxide selected, from the group consisting of oxides of silicon, germanium, and a mixture thereof; (2) one or more sources of an oxide selected from the group consisting of oxides of aluminum, boron, iron, gallium, and mixtures thereof; (3) at least one active source of an element selected from Groups 1 and 2 of the Periodic Table; (4) hydroxide ions; (5) a structure directing agent selected from the group consisting of 1,5-bis(N,N-dimethylcyclohexylammonium)pentane dications, 1,4-bis(N-cyclohexylpiperidinium)butane dications and 1,4-bis(N-cyclopentylpiperidinium)butane dications, and (6) water; and (b) maintaining the reaction mixture under conditions sufficient to form crystals of the zeolite.

2. The process according to claim 1, wherein the reaction mixture has the following molar ratios:

| | |
|---|---|
| $YO_2/W_2O_3$ | 8-120 |
| $M/YO_2$ | 0.05-0.50 |
| $Q/YO_2$ | 0.05-0.50 |
| $OH/YO_2$ | 0.10-1.0 |
| $H_2O/YO_2$ | 10-200 | wherein:

(1) Y is selected from the group consisting of silicon, germanium, and a mixture thereof;

(2) W is selected from the group consisting of oxides of aluminum, boron, iron, gallium, and mixtures thereof;

(3) M is the element selected from Groups 1 and 2 of the Periodic Table; and (4) Q is the structure directing agent.

3. The process according to claim 2, wherein the reaction mixture has the following molar ratios:

| | |
|---|---|
| $YO_2/W_2O_3$ | 10-60 |
| $M/YO_2$ | 0.05-0.30 |
| $Q/YO_2$ | 0.10-0.25 |
| $OH/YO_2$ | 0.20-0.50 |
| $H_2O/YO_2$ | 20-60. |

4. The process according to claim 2, wherein Y is silicon and W is aluminum, and the reaction mixture has the following molar ratios:

| | |
|---|---|
| $SiO_2/Al_2O_3$ | 20-80 |
| $M/SiO_2$ | 0.05-0.50 |
| $Q/SiO_2$ | 0.05-0.50 |
| $OH/SiO_2$ | 0.10-1.0 |
| $H_2O/SiO_2$ | 10-200. |

5. The process according to claim 4, wherein the reaction mixture has the following molar ratios:

| | |
|---|---|
| SiO$_2$/Al$_2$O$_3$ | 20-50 |
| M/SiO$_2$ | 0.05-0.30 |
| Q/SiO$_2$ | 0.10-0.25 |
| OH/SiO$_2$ | 0.20-0.50 |
| H$_2$O/SiO$_2$ | 20-60. |

6. The process according to claim 2, wherein Y is silicon and W is boron, and the reaction mixture has the following molar ratios:

| | |
|---|---|
| SiO$_2$/B$_2$O$_3$ | 8-120 |
| M/SiO$_2$ | 0.05-0.50 |
| Q/SiO$_2$ | 0.05-0.50 |
| OH/SiO$_2$ | 0.10-1.0 |
| H$_2$O/SiO$_2$ | 10-200. |

7. The process according to claim 6, wherein the reaction mixture has the following molar ratios:

| | |
|---|---|
| SiO$_2$/B$_2$O$_3$ | 10-60 |
| M/SiO$_2$ | 0.05-0.30 |
| Q/SiO$_2$ | 0.10-0.25 |
| OH/SiO$_2$ | 0.20-0.50 |
| H$_2$O/SiO$_2$ | 20-60. |

8. The process according to claim 1, wherein the structure directing agent is a 1,5-bis(N,N-dimethylcyclohexylammonium)pentane dications.

9. The process according to claim 1, wherein the structure directing agent is a 1,4-bis(N-cyclohexylpiperidinium)butane dications.

10. The process according to claim 1, wherein the structure directing agent is a 1,4-bis(N-cyclopentylpiperidinium)butane dications.

* * * * *